United States Patent [19]

Grisard

[11] Patent Number: 5,215,373
[45] Date of Patent: Jun. 1, 1993

[54] BARREL FOR A MATERIAL TREATING MACHINE

[75] Inventor: Patrice J. J. Grisard, Saint Etienne, France

[73] Assignee: Clextral, Coubevoie, France

[21] Appl. No.: 725,787

[22] Filed: Jul. 8, 1991

[30] Foreign Application Priority Data

Jul. 6, 1990 [FR] France .................. 90 08635

[51] Int. Cl.⁵ ............................................. B28C 7/04
[52] U.S. Cl. ........................................ 366/85; 366/92; 366/302; 425/204
[58] Field of Search .................. 366/15, 66, 79, 83, 366/84, 85, 88, 90, 266, 290, 291, 292, 297, 300, 301, 338, 339, 92, 302; 425/204, 208

[56] References Cited

U.S. PATENT DOCUMENTS

| | | | |
|---|---|---|---|
| 4,136,969 | 1/1979 | Meyer | 425/208 |
| 4,299,499 | 11/1981 | Buchheit . | |
| 4,300,840 | 11/1981 | Kishihiro | 425/208 |
| 4,324,493 | 4/1982 | Colombo | 366/79 |
| 4,330,214 | 5/1982 | Willert | 366/79 |
| 4,453,905 | 6/1984 | Bennett | 366/79 |
| 4,517,107 | 5/1985 | Clarke | 425/204 |
| 4,695,165 | 9/1987 | Fukumizu | 425/208 |
| 4,779,989 | 10/1988 | Barr | 425/208 |
| 4,863,363 | 9/1989 | Haring | 366/85 |
| 5,044,757 | 9/1991 | Dienst | 366/85 |

FOREIGN PATENT DOCUMENTS

| | | | |
|---|---|---|---|
| 958698 | 12/1974 | Canada | 366/266 |
| 0116773 | 8/1984 | European Pat. Off. . | |
| 1502335 | 2/1969 | Fed. Rep. of Germany . | |
| 1909818 | 2/1969 | Fed. Rep. of Germany . | |
| 3728442 | 8/1987 | Fed. Rep. of Germany . | |
| 2200106 | 9/1973 | France . | |
| 2636560 | 9/1988 | France . | |
| 115424 | 11/1983 | Japan | 366/79 |
| 2-6002222 | 5/1990 | Japan . | |
| 232413 | 8/1944 | Switzerland | 425/204 |

*Primary Examiner*—Harvey C. Hornsby
*Assistant Examiner*—Till. Terrence R.
*Attorney, Agent, or Firm*—Pollock, Vande Sande & Priddy

[57] ABSTRACT

The barrel (20) comprises at least two intersecting lobes (21a, 21b) of cylindrical bores having parallel axes each corresponding to a screw and defining in the region of their intersection at least two longitudinal parallel edges (22). Each lobe comprises at least one shearing zone (23a, 23b) adapted to cooperate with a shearing element mounted on the respective screws. The shearing zone (23a, 23b) of each lobe is formed by least one groove (24a, 24b) extending in the direction of the flow of the material and provided on the inner side of the barrel (20), the groove providing therebetween and each edge (22) a portion of a continuous surface of the cylindrical bore forming the corresponding lobe.

5 Claims, 5 Drawing Sheets

BARREL FOR A MATERIAL TREATING MACHINE

FIELD OF THE INVENTION

The present invention relates to a barrel for a material treating machine having at least two parallel screws.

The invention is particularly applicable to extruders with at least two screws, and more generally to machines in which mixing, working or kneading, grinding and in particular shearing effects are produced by the passage through the barrel of a material driven along by the rotation of the screws.

BACKGROUND OF THE INVENTION

A conventional screw-type material treating machine, as shown in the accompanying FIGS. 1 to 3, generally comprises an elongated barrel 2 surrounding the screws 1a and 1b and, in the case of machines having two screws, the barrel 2 is provided with two cylindrical bores having parallel axes, the distance between the latter being less than the diameter of the bores so as to form two intersecting lobes 3a and 3b containing the screws 1a and 1b which are meshed with each other. In the region of their intersection two lobes 3a and 3b define two longitudinal edges 4 parallel to the axes of the screws 1a and 1b.

The screws 1a and 1b are provided on their periphery with helical flights which drive the material introduced through the upstream end of the barrel 2 to the downstream end of the barrel which may be provided with an extrusion die or a simple outlet orifice in the case where the material does not have to be extruded.

In order to vary the treatment achieved in the course of the advance of the material through the barrel 2, the screws 1a and 1b are usually made up of successive zones having flights of different shapes or pitches or comprising special treating elements.

For example, there may be employed conveying sections having large pitches or sections having narrowed pitches or even shearing sections which, among other things, contribute to the mixing and dispersion of fillers or pigments in the material, and which generate self-heating of the material by a viscous dissipation of the mechanical power.

For this purpose, the screws 1a and 1b include shearing elements 6a and 6b (FIG. 2) which may be formed by unmeshed depression-creating elements such as, for example, counterflights or kneading discs.

In order to vary the work done by the shearing elements 6a and 6b, escape chambers 5a and 5b are formed by a cylindrical bore of larger diameter than the bore of the corresponding lobe 3a and 3b.

It is known that, in the air gap 7 (FIG. 2) formed between the bore of the lobe 3a and 3b and the corresponding shearing element 6a and 6b, a shearing field prevails which contributes to the mixing and dispersion of the fillers in the material and which generates self-heating of the material.

By modification of the position of a movable barrel relative to fixed screws, or of the position of screws axially movable relative to a fixed barrel, the length of the air gap and consequently the shear stress is controlled and, by these means so as, the degree of self-heating or thermomechanical degradation of the treated material or the homogeneity of the mixture.

In order to obtain effective shearing of the treated material, the shearing zone must be constant and the intersection edges of the two lobes continuous so as to force the material to pass through the air gaps.

In prior art installations, the bores of the escape chambers 5a and 5b open out in the region of the edges 4 so that the intersections of the bores of the escape chambers 5a and 5b and the bores of the contiguous lobes 3a and 3b form, in the plane of the edges 4, two broken lines 4a, as shown in FIGS. 2 and 3.

These broken lines 4a create transverse escape paths through which the material flows, so that the adjustment of the length of the air gaps in accordance with the treated material cannot be achieved to obtain the desired quality of the material.

SUMMARY OF THE INVENTION

An object of the present invention is to overcome the aforementioned drawbacks and permit reliable and effective control of the intensity of shearing of the treated material.

The invention therefore provides a barrel for a material treating machine comprising at least two imbricated screws driven in rotation inside the barrel, which comprises at least two intersecting lobes of a cylindrical bore having parallel axes and each corresponding to a screw and defining in the region of the intersection of the lobes at least two parallel longitudinal edges, each lobe being provided with at least one shearing zone adapted to cooperate with a shearing element mounted on the screws. The shearing zone of each lobe is formed by at least one groove extending in the direction of flow of the treated material and provided on the inner side of the barrel, the groove delimiting between said groove and each intersection edge of the lobes, a portion of a continuous surface of the cylindrical bore forming the corresponding lobe.

According to other features of the invention:
 (a) the groove is parallel to the axis of the corresponding lobe;
 (b) the groove has a helical shape and terminates before each intersection edge of the lobes;
 (c) the groove is rectangular in cross-section;
 (d) the groove is circular in cross-section.

BRIEF DESCRIPTION OF THE DRAWINGS

Other features and advantages of the invention will be apparent from the following description, which refers to the accompanying drawings, in which.

DESCRIPTION OF PREFERRED EMBODIMENT

Figure 1:
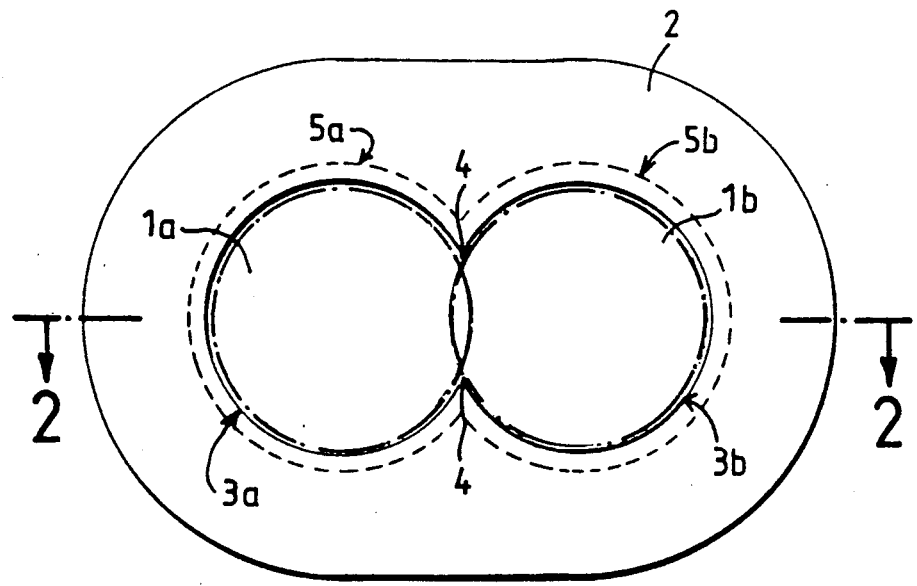
FIG. 1 is a cross-sectional view of a barrel of a material treating machine according to the prior art.
Figure 2:
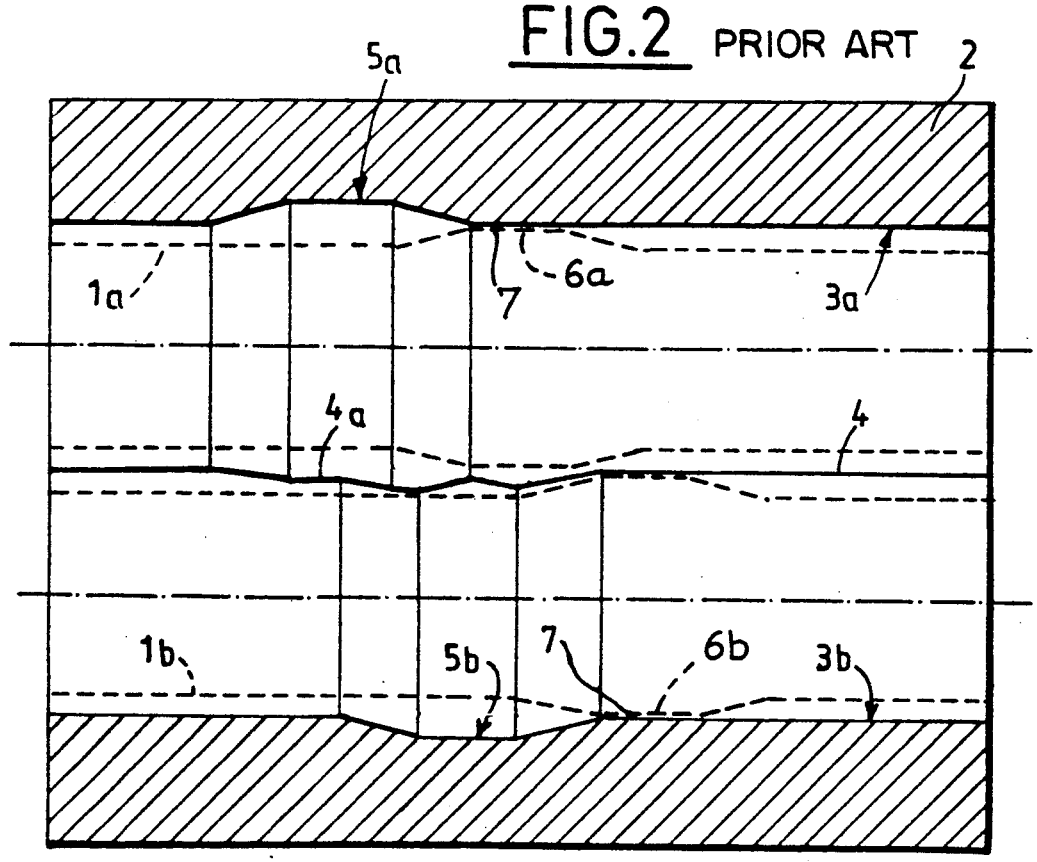
FIG. 2 is a sectional view taken on line 2—2 of FIG. 1.
Figure 3:
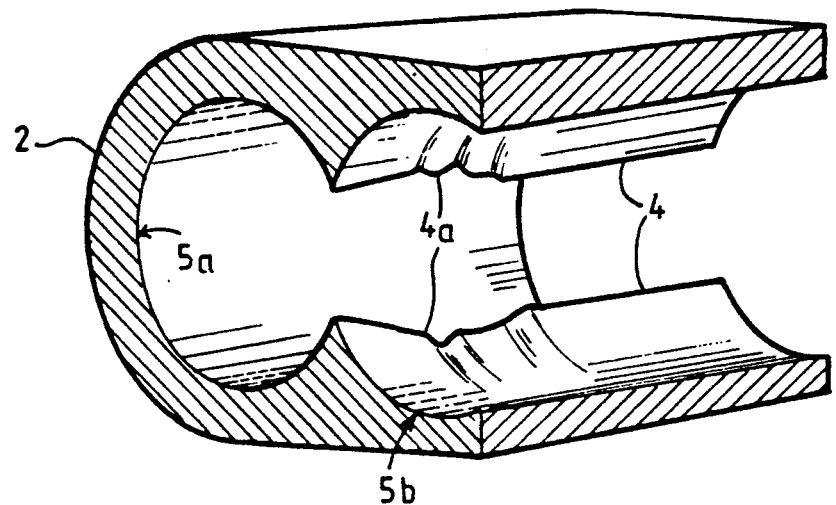
FIG. 3 is a perspective view, partly in section, of a portion of the barrel showing an escape chamber according to the prior art.

With reference to FIGS. 4 to 7, it can be seen that the material treating machine comprises, in the conventional manner, an elongated barrel 2 surrounding screws 10a and 10b.

The barrel 20 is provided with two cylindrical bores having parallel axes, the distance between the axes being less than the diameter of the bores so as to form two intersecting lobes 21a and 21b in which are placed two meshed screws 10a and 10b.

The two lobes 21a and 21b define in the region of their intersection two longitudinal edges 22 parallel to the axes of said screws 10a and 10b.

Depending on the type of treatment it is desired to effect and on the treated material, each lobe 21a and 21b comprises one or more shearing zones 23a and 23b, respectively, which contribute to the mixing and the dispersion of the fillers or pigments of the material and which generate self-heating of the material by viscous dissipation of the mechanical power.

Each shearing zone 23a and 23b is formed by at least one groove 24a and 24b respectively extending in the direction of the flow of the treated material and formed on the inner side of the barrel 20.

These grooves 24a and 24b define, therebetween and the edges 22 of intersection of the lobes 21a and 21b, a portion of a continuous surface of the cylindrical bore forming the lobes so as to avoid modifying the continuity of these edges.

Figure 4:
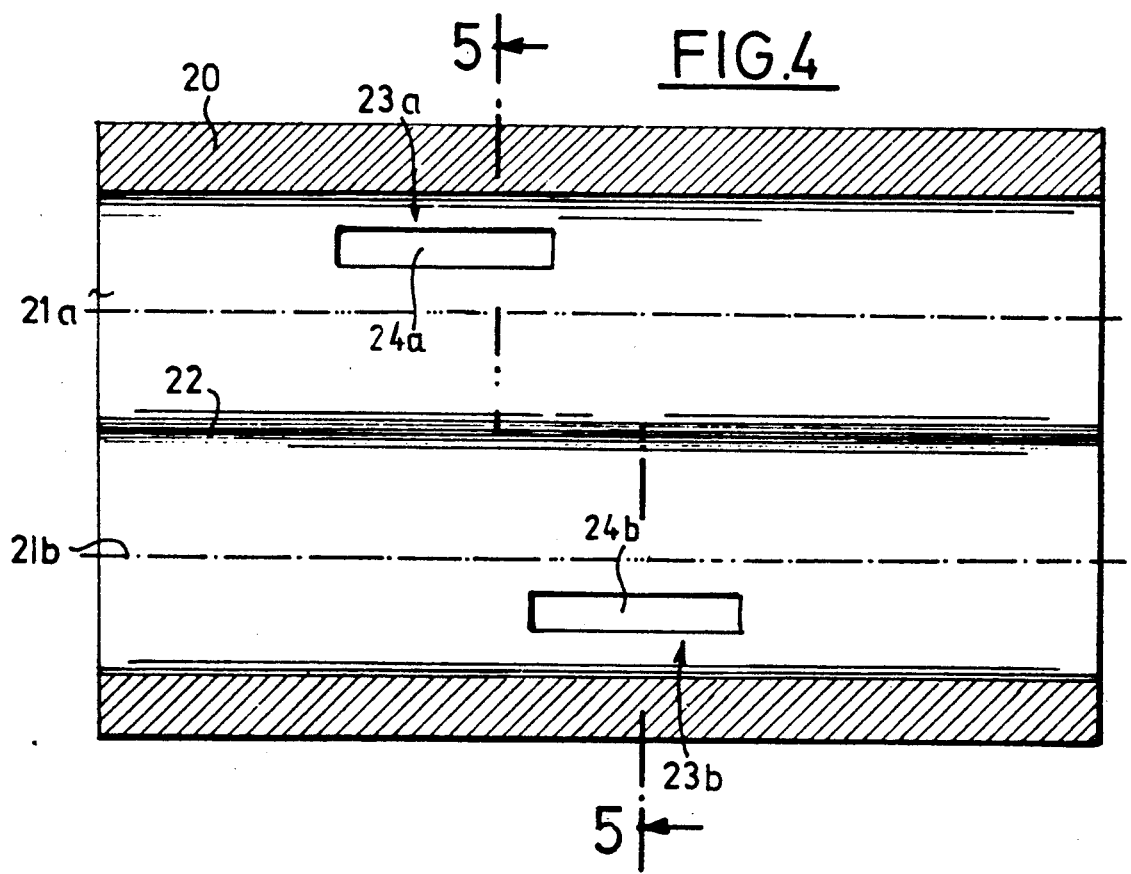
FIG. 4 is a longitudinal sectional view taken on the axes of the screws of a barrel of a material treating machine according to the invention.
Figure 5:
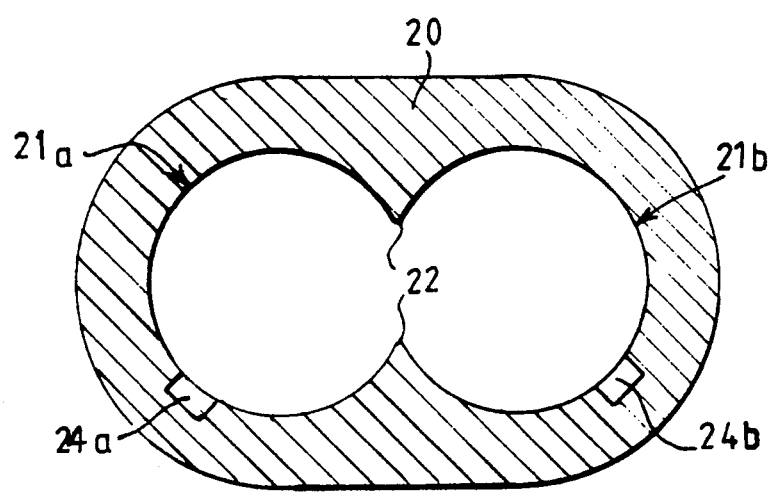
FIG. 5 is a sectional view taken on line 5—5 of FIG. 4.

In a first embodiment, shown in FIGS. 4 and 5, each groove 24a and 24b is parallel to the axis of the corresponding lobe 21a and 21b.

Each lobe 21a and 21b may comprise more than two parallel grooves 24a and 24b.

These grooves 24a and 24b may have a cross-section of any shape, such as a rectangular or circular shape.

Each groove 24a and 24b is adapted to cooperate with a shearing element 11a and 11b (FIG. 6) or 12a and 12b (FIG. 7) mounted on each screw 10a and 10b for adjusting the active length of the shearing element.

Figure 6:
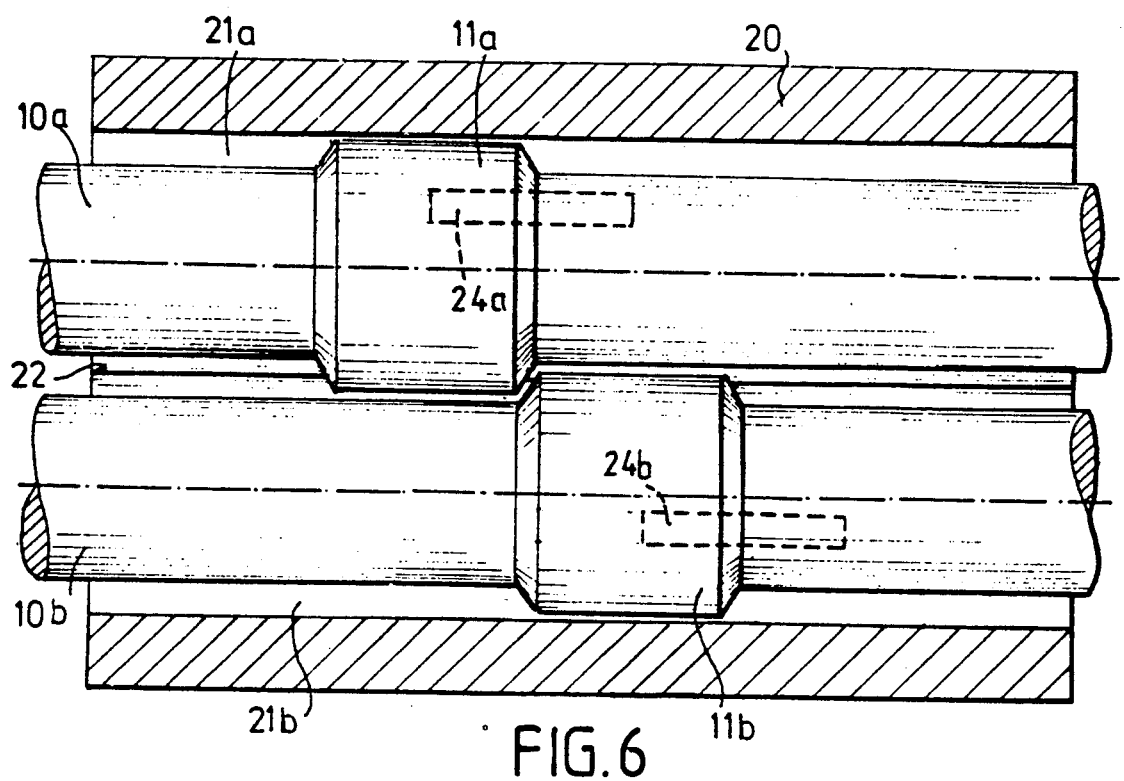
FIG. 6 is a longitudinal sectional view taken on the axes of the screws of the barrel according to the invention, with unmeshed shearing elements.
Figure 7:
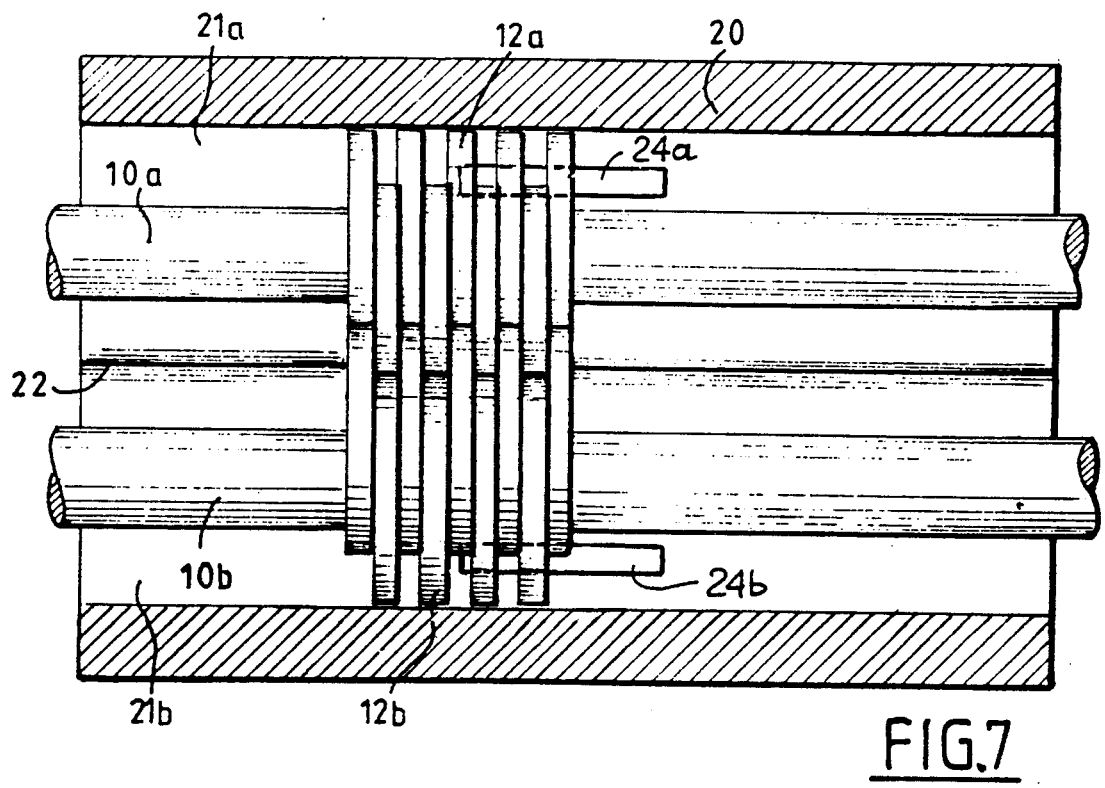
FIG. 7 is a longitudinal sectional view taken on the axes of the screws of the barrel according to the invention, with meshed shearing elements.

The shearing elements 11a and 11b are formed, for example, by unmeshed depression-producing elements such as "Couette rolls" (FIG. 6).

Each shearing element 11a and 11b defines with the bore of the corresponding lobe 21a and 21b an air gap in which prevails a shearing field which contributes to the mixing and dispersion of the fillers or pigments in the material, and which generates self-heating of the material by viscous dissipation of the mechanical power.

By axial shifting of the barrel 20 or of the screws 10a and 10b relative to the other machine part, the position of each shearing element 11a, 11b with respect to the corresponding groove 24a, 24b is controlled. This allows modification or control of the length of the air gaps and, thus, the degree of self-heating or thermomechanical degradation of the treated material or the homogeneity of the mixture.

FIG. 6 shows an intermediate position in which the shearing elements 11a and 11b overlap the grooves 24a and 24b and in this way permit a medium working of the treated material.

In the case where the shearing elements 11a and 11b coincide with the grooves 24a and 24b, no work is done by the shearing elements 11a and 11b.

To obtain maximum working, the shearing elements 11a and 11b are completely shifted away from the grooves 24a and 24b.

In the shearing zones 23a and 23b, all the material is made to pass through the very narrow and very short air gaps.

The shearing elements 12a and 12b may also be formed for example, by meshed depression-producing elements such as counter-flights, kneading or working discs or alternating discs (FIG. 7) which define an air gap with the bottom of the corresponding groove 24a and 24b.

In this case, the grooves 24a and 24b are disposed in confronting relation and the length of the air gaps is modified or controlled by axial shifting of the barrel 20 or the screws 10a and 10b relative to the other element.

Figure 8:
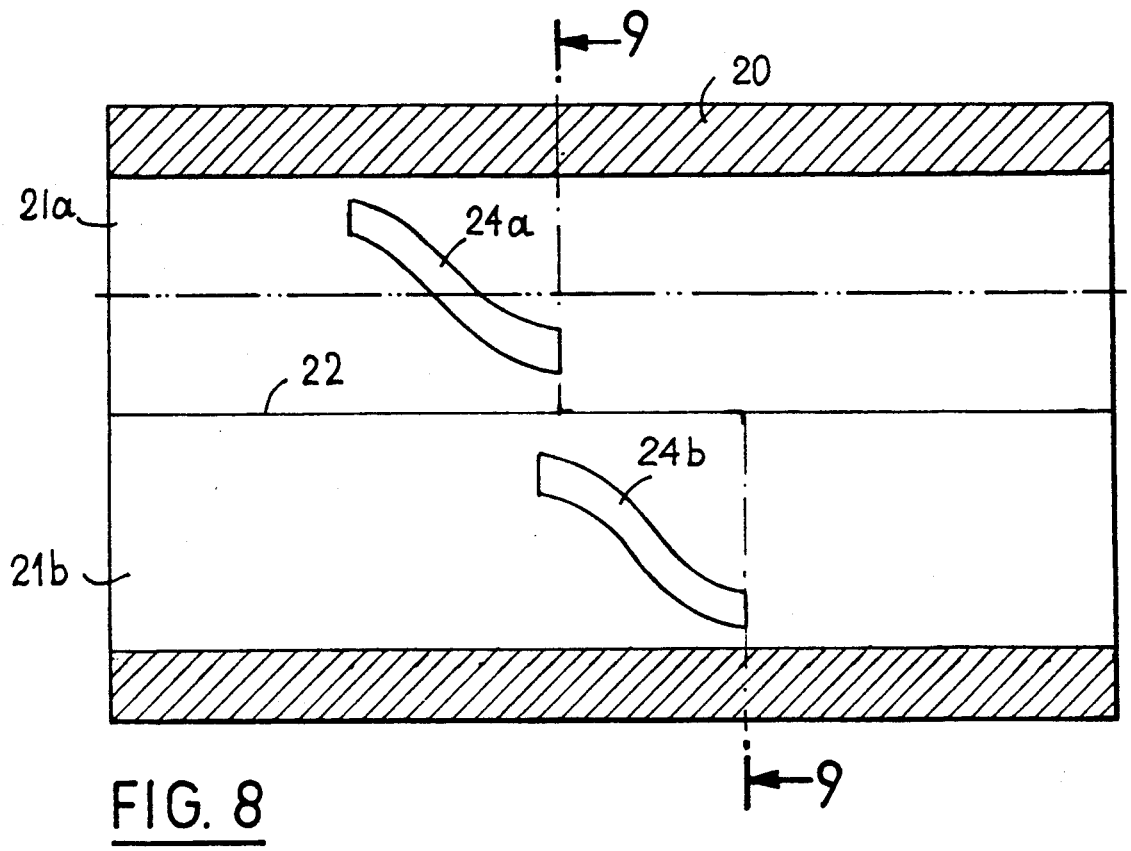
FIG. 8 is a longitudinal sectional view taken on the axes of the screws of a modification of the barrel according to the invention.
Figure 9:
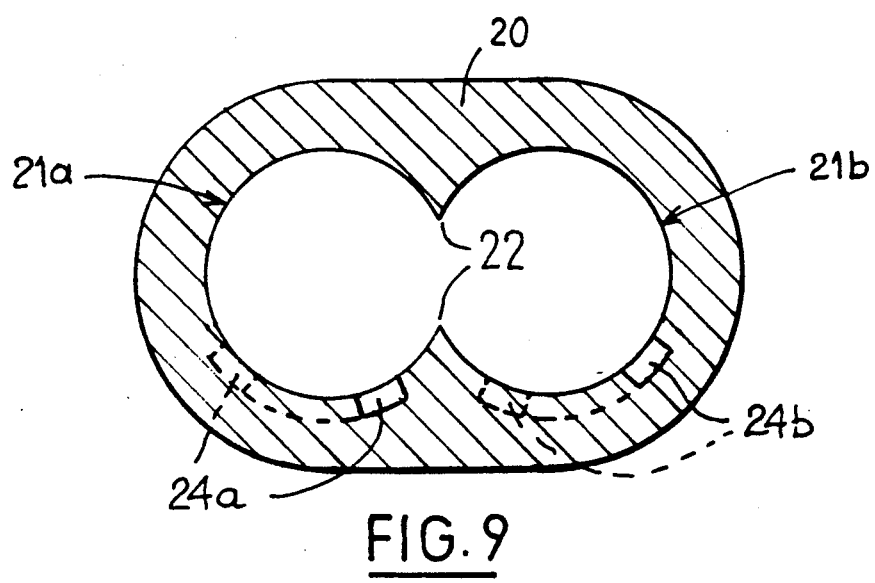
FIG. 9 is a sectional sectional view taken on line 9—9 of FIG. 8.

In another embodiment, shown in FIGS. 8 and 9, the grooves 24a and 24b have a helical shape and terminate before each intersection edge 22 so as to form a portion of a continuous surface of the cylindrical bore forming the corresponding lobe 21a and 21b.

Each lobe 21a and 21b may also include more than two parallel grooves 24a and 24b, and these grooves may have a cross-section of any shape, such as, for example, a rectangular or circular shape.

One of the lobes may include, for example, grooves parallel to the axis of the screws, and the other lobe may include, for example, helical grooves.

Owing to the disposition of the grooves 24a and 24b and the continuity of the intersection edges 22 of the lobes 21a and 21b of the barrel according to the invention, constant shearing zones are provided which permit working the material under the best possible conditions.

In some cases, it is necessary to multiply the shearing zones.

For this purpose, the screws 10a and 10b comprise a succession of shearing elements and each lobe comprises a succession of grooves.

What is claimed is:

1. A barrel for a material treating machine comprising at least two imbricated screws mounted for rotation within said barrel, a shearing element being mounted on each of said screws, said barrel comprising at least two intersecting lobes of cylindrical bores having parallel axes, each of said lobes being associated with a respective one of said screws, said intersecting lobes defining in a region of an intersection of said lobes at least two longitudinal parallel intersection edges, each of said lobes comprising at least one shearing zone cooperating with said shearing element mounted on the associated one of said screws said shearing zone of each lobe being formed by at least one groove disposed on an inner side of said barrel and extending in a direction of flow of said material through said barrel, said groove delimiting, between said groove and each of said intersection edges of said two lobes, a portion of a continuous surface of said cylindrical bore of said corresponding lobe.

2. A barrel according to claim 1, wherein said groove is parallel to the axis of said respective lobe.

3. A barrel according to claim 1, wherein said groove is of helical shape and terminates before each of said intersection edges of said lobes.

4. A barrel according to claim 1, wherein said groove has a rectangular cross-sectional shape.

5. In a material treating machine: a barrel, at least two imbricated screws rotatively mounted inside said barrel, said barrel comprising at least two intersecting lobes of cylindrical bores having parallel axes, each of said lobes corresponding to a respective one of said screws, said lobes defining in a region of said intersection of said lobes at least two parallel longitudinal intersection edges, each screw comprising a shearing element, each lobe comprising at least one shearing zone cooperating with a respective for of said shearing elements, said shearing zone of each of said lobes being defined by at least one groove disposed on an inner side of said barrel and extending in a direction of flow of said material through said barrel, said groove delimiting between said groove and each of said intersection edges of said two lobes, a portion of a continuous surface of said cylindrical bore of said corresponding lobe.

* * * * *